US006397046B1

(12) United States Patent
Kfoury

(10) Patent No.: US 6,397,046 B1
(45) Date of Patent: May 28, 2002

(54) HANG-UP CUP ASSEMBLY

(75) Inventor: Tony N. Kfoury, Lisle, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/270,720

(22) Filed: Mar. 17, 1999

(51) Int. Cl.⁷ .............................. H04Q 7/04; H04M 1/00
(52) U.S. Cl. ..................... 455/90; 455/550; 379/446; 379/454; 379/455; 248/176.1
(58) Field of Search ................... 248/176.1; 455/90, 455/550; 379/446, 454, 455

(56) References Cited

U.S. PATENT DOCUMENTS

| | | | |
|---|---|---|---|
| 4,196,319 A | * | 4/1980 | Gates .......................... 379/454 |
| 4,560,831 A | * | 12/1985 | Bast et al. .................... 379/454 |
| 4,613,251 A | | 9/1986 | Bellamy et al. |
| 4,617,430 A | | 10/1986 | Bryant |
| 4,645,155 A | | 2/1987 | Eldon et al. |
| 4,986,503 A | | 1/1991 | Kabat |
| 5,109,411 A | | 4/1992 | O'Connell |
| 5,187,744 A | | 2/1993 | Richter |
| 5,568,548 A | | 10/1996 | Repplinger et al. |
| 5,790,910 A | | 8/1998 | Haskin |
| 5,799,914 A | | 9/1998 | Chivallier et al. |
| 5,979,724 A | * | 11/1999 | Loewenthal, Jr. et al. .. 224/483 |

OTHER PUBLICATIONS

The Antenna company, Advertisement: *Any way you want it*, Cellular Business, Nov. 1992, at 25.

* cited by examiner

Primary Examiner—Daniel Hunter
Assistant Examiner—Alan T. Gantt
(74) Attorney, Agent, or Firm—Sylvia Y. Chen; Roland K. Bowler, II

(57) ABSTRACT

The hang-up cup assembly (100) for a radiotelephone has a cradle (200) secured to a pedestal (300) using a ball (320) and a socket (220) of a ball-and-socket joint (120), a screw (400), and a dome nut (600). The ball-and-socket joint (120) is compressed by the screw (400) and the dome nut (600) to retain the hang-up cup assembly (100) in the desired position. The hang-up cup assembly (100) has a low profile, is easy to install, and can be adjusted by an end user by slightly loosing the easily-accessible screw (400), repositioning the cradle (200) relative to the pedestal (300), and tightening the screw (400) to compress the ball-and-socket joint (120) and maintain the desired new position.

20 Claims, 3 Drawing Sheets

HANG-UP CUP ASSEMBLY

CROSS REFERENCE TO RELATED APPLICATIONS

This application is related to copending U.S. patent application Ser. No. 29/102,103 filed on even date herewith by Tony Kfoury and entitled "Hang-Up Cup". The related application is assigned to the assignee of the present application and is hereby incorporated herein in its entirety by this reference thereto.

FIELD OF THE INVENTION

This invention relates generally to hang-up cups for radiotelephone handsets.

BACKGROUND OF THE INVENTION

Hang-up cups provide a storage place for radiotelephone handsets. A cradle of a hang-up cup retains a portion of a radiotelephone, such as an earpiece, or the entire handset. Hang-up cups are typically mounted in a vehicle at a location that facilitates the vehicle operator's access to the handset, such as a dashboard or driver console. When used with a handset having a display and a keypad, the hang-up cup positions the handset so that the display is readily visible and the keypad is accessible for dialing by a user.

Because a single type of hang-up cup is installed in many types of vehicles in a variety of locations, it is often difficult to position the hang-up cup and orient a radiotelephone handset to the satisfaction of each user. In order to provide versatility in positioning, the cradle is often mounted on a pedestal which is affixed to a vehicle dashboard or center console. The orientation of the cradle with respect to the pedestal is adjusted to the desired position, and the hang-up cup is retained to the pedestal in that position. Such hang-up cups, however, are often difficult to install, position properly, and readjust to a new position. Accordingly, it is desirable to provide an improved hang-up cup that is versatile in use, simple to install and adjust, compact in size, and easy to manufacture.

DETAILED DESCRIPTION OF THE PREFERRED EMBODIMENTS

The hang-up cup assembly for a radiotelephone has a cradle secured to a pedestal using a ball-and-socket joint, a screw, and a dome nut. Due to the ball-and-socket joint, the cradle can be adjusted relative to the pedestal at 360 degrees of rotational angle relative to a plane of a mounting surface to position a radiotelephone handset in a desired orientation in a preferred location. The ball-and-socket joint is compressed by the screw and dome nut to retain the hang-up cup assembly in the desired position. The hang-up cup assembly is easy to manufacture, install, and position by an installation professional. The hang-up cup assembly also has a low profile and can be easily adjusted by the end user by slightly loosing the screw, repositioning the cradle relative to the pedestal, and tightening the screw to compress the joint and maintain the desired new position.

Figure 1:
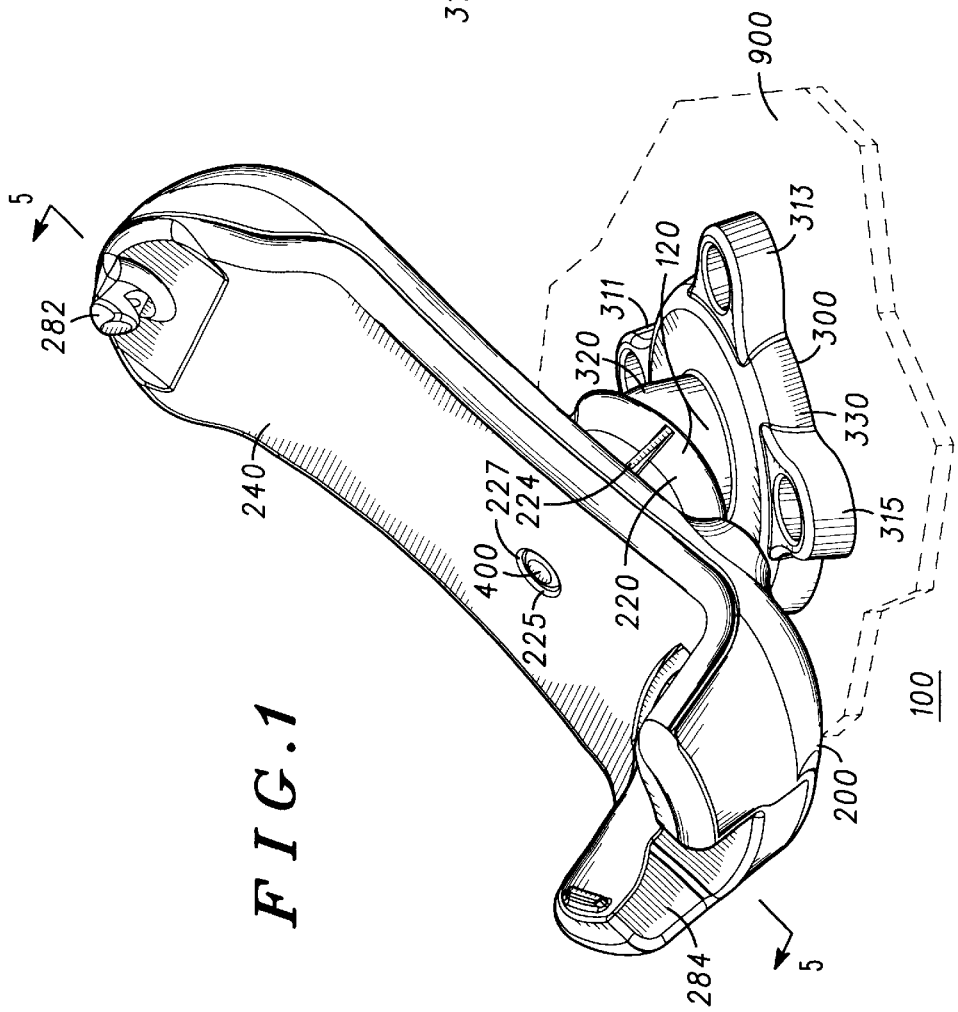
FIG. 1 shows a perspective view of a hang-up cup assembly according to a preferred embodiment having a cradle and a pedestal.

FIG. 1 shows a perspective view of a hang-up cup assembly 100 according to a preferred embodiment having a cradle 200 and a pedestal 300. The hang-up cup assembly 100 can be affixed to a mounting surface 900 such as a vehicle dashboard or a center console. The pedestal 300 of the hang-up cup assembly 100 has a base 330 with four areas 311, 313, 315, 317 (not visible in this drawing) that can be used to secure the hang-up cup assembly 100 to the mounting surface. These areas 311, 313, 315, 317 include apertures contemplating a bolt and nut fastening from the pedestal 300 to the mounting surface 900; however, heavy-duty adhesive, nails, screws, or other fasteners can be used in lieu of bolt and nut fastenings.

A body 240 of the cradle 200 holds a radiotelephone (not shown) that includes a display and a keypad. Preferably, the radiotelephone is positioned in the cradle 200 such that the display can be easily seen and the keypad can be easily operated while the radiotelephone is in the hang-up cup assembly 100. One or more retainers 282, 284 keep the radiotelephone firmly positioned in the cradle 200 and yet allow release of the radiotelephone when a user tries to remove it. One or more of the retainers 282, 284 can be a moveable mechanism to engage with a housing of the radiotelephone and keep the radiotelephone in the cradle 200 once it is inserted. Preferably the lower retainer 284 is a spring-loaded mechanism that moves under force when the radiotelephone is inserted or removed and moves back to retain the radiotelephone in the body 240. Alternately, the retainers 282, 284 can made of a rigid but flexible material such as spring metal, plastic, or hard rubber.

The cradle 200 is manufactured from any rigid material, preferably injection-molded plastic. The cradle 200 includes a hole 225 for receiving a threaded fastener such as a screw 400 (with a notched head) or a bolt (without a notched head). Preferably, the hole 225 includes a recess 227 to accept the head of the screw 400. The recess 227 would allow the screw 400 to be flush or depressed into the body 240 of the cradle 200. A socket 220 is located opposite the hole 225, on the underside of the body 240. Although the hole 225 and socket 220 are shown positioned substantially in the center of the cradle 200, the hole 225 and socket 220 can be located almost anywhere in the body 240 of the cradle 200. Note that the socket 220 can be manufactured as a separate piece from the body 240 of the cradle 200, or the socket 220 can be integral to other parts of the cradle 200.

The screw 400 passes through the hole 225 in the body 240 of the cradle 200 and into a ball-and-socket joint 120 which includes the socket 220 that mates with a hollow ball 320 of the pedestal 300. Inside the hollow ball 320, a dome nut (to be described later) retains the screw 400, which compresses the ball-and-socket joint 120 and keeps the cradle 200 in position relative to the pedestal 300. Note that the hollow ball 320 is not a complete hollow sphere, but merely a generally dome-shaped ball portion of the ball-and-socket joint 120.

Due to the ball-and-socket joint 120 of the hang-up cup assembly 100, the cradle 200 can be swiveled 360 degrees relative to a plane of the mounting surface 900 of the pedestal 300. Thus, the hang-up cup assembly 100 can be mounted and adjusted to various positions to facilitate ease of use of the radiotelephone by an end user. In order to reposition the hang-up cup assembly 100 if the screw loosens or the cradle is knocked out of place or the end user desires a different orientation, the end user loosens the screw 400 by unscrewing it slightly, repositions the cradle 200, and tightens the screw 400. The concave surface of the socket 220 and the convex surface of the ball 320 can be textured to provide additional friction and hinder unintended movement of the ball-and-socket joint 120. The screw 400 and dome nut 600 compress the ball-and-socket joint 120 so that the cradle is fixed into place. The hang-up cup assembly 100 can be used not only with radiotelephones, but also AM/FM radios, cassette players, calculators, or other portable electronic devices.

Figure 2:
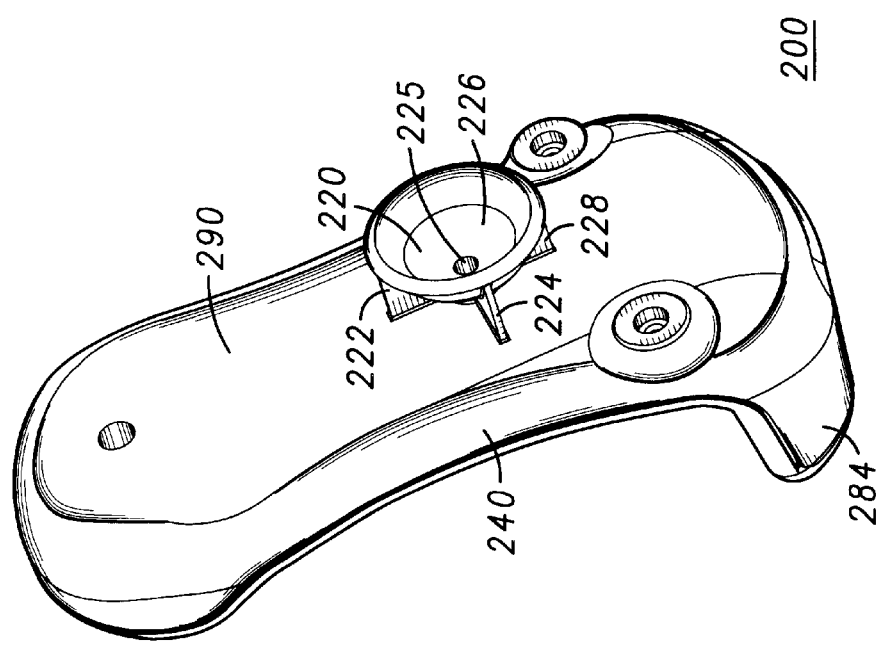
FIG. 2 shows a rear perspective view of the cradle shown in FIG. 1.

FIG. 2 shows a rear perspective view of the cradle 200 shown in FIG. 1. The socket 220, which preferably has a dome shape, is formed on an underside 290 of the cradle 200. The socket 220 has a concave surface 226 for mating with the socket 320 shown in FIG. 1. The dome shape of the socket 220 does not need to have a constant radius, nor does it need to be a hemisphere; the dome-shaped socket 220 simply allows a 360 degree range of positions for the cradle 200 relative to a plane of a mounting surface of the pedestal 300. Stabilizers 222, 224, 228, and another stabilizer that is not visible opposite stabilizer 224, strengthen the connection between the socket 220 and the remainder of the cradle 200. The hole 225 shown in FIG. 1 goes from the upperside of the cradle 200 to the underside 290 of the cradle 200 and through the adjoining region of the socket 220.

The specific dimensions of the cradle 200 are designed to fit one or more styles of radiotelephones, and the retainers 282 (not visible), 284 of the cradle 200 are designed to hold one or more styles of radiotelephones. The cradle 200 is preferably manufactured using injection-molded plastic, so that the socket 220 can be manufactured as a section of another part of the cradle 200.

Figure 3:
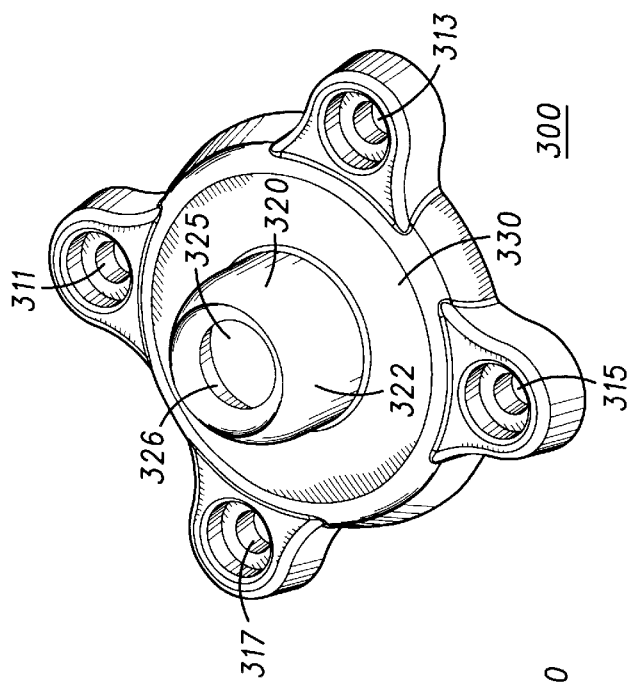
FIG. 3 shows a front perspective view of the pedestal shown in FIG. 1.

FIG. 3 shows a front perspective view of the pedestal 300 shown in FIG. 1. The pedestal 300 includes a base 330 that can be fastened to a mounting surface (not shown). The preferred embodiment has four areas 311, 313, 315, 317 designed for receiving four bolts so that the pedestal 300 can be bolted to the mounting surface. The base 330, however, can be affixed to the mounting surface using other methods such as adhesive, nails, or screws. Preferably, the base 330 is constructed of an injection molded plastic.

The pedestal 300 includes a hollow ball 320 with a hole 325. The convex surface 322 of the ball 320 is adapted to mate with the concave surface 226 of the socket 220 of the cradle 200 shown in FIG. 2. The mating surfaces can be textured using bumps, cross-hatching, indents, or other techniques, to provide additional friction between the ball 320 and socket 220 if needed. The hole 325 is preferably a circular shape at the apex of the ball 320; however, the hole 325 can have other shapes and be located off-center from the apex of the ball 320. The hole 325 allows movement of the screw 400 inside the ball-and-socket joint 120 so that the hang-up cup assembly 100 can be placed in a variety of positions. The ball 320 also has a concave surface 326 for mating with a dome nut (to be described later).

Figure 4:
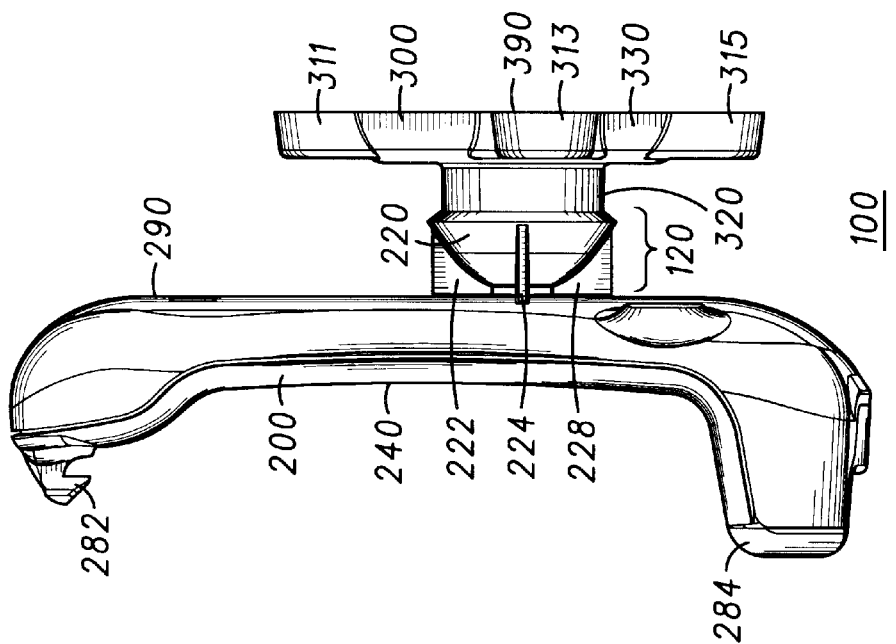
FIG. 4 shows a side view of the hang-up cup assembly shown in FIG. 1.

FIG. 4 shows a side view of the hang-up cup assembly 100 shown in FIG. 1. The assembled hang-up cup assembly 100 has a low profile from the underside 390 of the pedestal 300 to the underside 290 of the cradle 200. The lower limit to the profile is the height of the ball-and-socket joint 120 when the socket 220 is mated to the ball 320. The profile of the hang-up cup assembly 100 can be changed by increasing or decreasing the height or shape of the ball 320, lengthening or shortening the interface between the socket 220 and the rest of the cradle 200, increasing or decreasing the thickness of the ball-and-socket joint 120, or using various other techniques. As can be seen easily in this drawing, the ball-and-socket joint 120 allows for easy orientation of the cradle 200 in 360 degrees in a plane of a mounting surface (not shown) of the pedestal 300. By varying the height of the ball 320, the cradle 200 can be oriented in many positions non-parallel to the plane of the mounting surface. Thus, the pedestal 300 can be mounted on various surface orientations and still the cradle 200 can be positioned so that a radiotelephone affixed in the cradle 200 can be easily seen and operated by a user.

Figure 5:
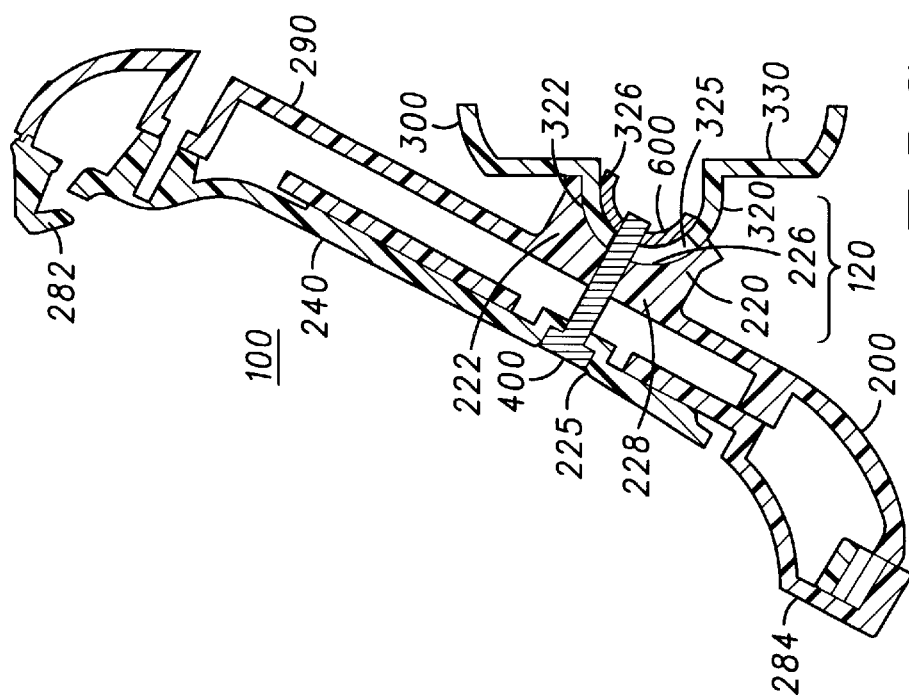
FIG. 5 shows a side cross-sectional view of the hang-up cup assembly taken along the plane 5—5 in FIG. 1.

FIG. 5 shows a side cross-sectional view of the hang-up cup assembly 100 taken along the plane 5—5 in FIG. 1. The concave surface 226 of the socket 220 contacts at least part of the convex surface 322 of the ball 320. The screw 400 is recessed into the cradle 200 and passes through the hole 225 in the cradle 200, the socket 220, and the hole 325 in the ball 320 of the pedestal 300. Either the hole 325 in the ball 320 or an edge of the socket 220 limits the range of positions for the hang-up cup assembly 100.

The screw 400 is held in place by a dome nut 600 inside the hollow ball 320. The dome nut 600 has a dome shape and engages with at least part of the concave surface 326 of the ball 320 and interacts with the screw 400. When the screw 400 is firmly tightened to the dome nut 600, the ball-and-socket joint 120 is compressed, the cradle 200 and pedestal 300 are firmly fastened together, and the cradle 200 does not move relative to the pedestal 300. The screw 400 and dome nut 600 are preferably constructed of a material, such as steel, that is harder than the material used to make the cradle 200 and the pedestal 300.

The user can loosen and tighten the ball-and-socket joint 120 from the easily-accessible upperside of the hang-up cup assembly 100. The head of the screw 400 is preferably a torque-plus-slot head. The torque portion of the head is designed for use by an installation professional to minimize chances of stripping the screw head during installation, while the slot portion of the head is available so that a user can readjust the hang-up cup assembly 100 without the need for a torque screwdriver. Other screw heads, such as Phillips, can be substituted for the torque-plus-slot head.

Figure 6:
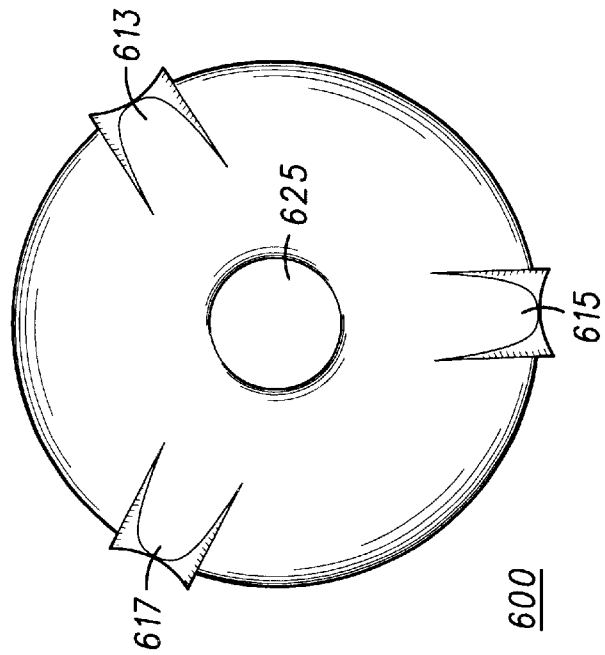
FIG. 6 shows details of a dome nut of the hang-up cup assembly according to the preferred embodiment.

FIG. 6 shows a top view of the dome nut 600 shown in FIG. 5. The dome nut 600 is preferably constructed from stamped die steel and has a threaded hole 625 for receiving the threads of the screw 400 shown in FIG. 5. The dome nut 600 also has at least one tooth 613, 615, 617 for biting into the concave surface 326 of the ball 320 shown in FIG. 5. Each tooth 613, 615, 617 has at least one angle that protrudes from the convex surface of the dome nut 600 to engage the plastic concave surface 326 of the ball 320. If the dome nut 600 is constructed from a material that is harder than the hollow ball 320, the teeth 613, 615, 617 dig into the concave surface 326 of the ball to lock the cradle 200 in position relative to the pedestal 300 and hinder inadvertent loosening of the hang-up cup assembly 100 due to effects such as vibration of the mounting surface, repeated insertion and removal of the radiotelephone, and accidental knocking of the hang-up cup assembly.

The shape of the teeth shown generally follows the convex surface of the dome nut 600. The maximum width of the teeth 613, 615, 617 can easily be adjusted depending on design considerations. For example, eight to ten narrower teeth can replace the three wide teeth shown. Also, the teeth can be constructed using different configurations, such as bumps, as long as a portion of a tooth engages with the concave surface 326 of the socket 220 to limit inadvertent loosening of the screw 400.

For the hang-up cup assembly 100, the orientation of the ball-and-socket joint 120 can be reversed so that the hollow ball is part of the cradle 200 while the socket is part of the pedestal 300. In this alternative, the orientation of the screw and dome nut can also be reversed, with the dome nut visible from a hole in the body of the cradle 200. Note that with the dome nut visible from the front of the cradle, the hang-up cup assembly 100 cannot be as conveniently adjusted by a user. Another alternative is to reverse the orientation of the ball-and-socket joint 120 but modify the nut so that it is bowl-shaped rather than dome-shaped. Thus, the head of the screw 400 is still recessed into the body of the cradle 200 and teeth on the concave surface of the bowl nut bite into the convex surface of the socket of the pedestal 300. Also, if desired, the convex inner surface of the hole in the pedestal can be threaded to partially or completely eliminate the need for a nut.

Thus, the hang-up cup assembly provides a low-cost, low-profile, easy-to-assemble, and easy-to-adjust mount for a radiotelephone. While specific components and functions of the hang-up cup assembly are described above, fewer or additional functions could be employed by one skilled in the art within the true spirit and scope of the present invention. The invention should be limited only by the appended claims.

I claim:

1. A hang-up cup assembly comprising:
   a cradle having a socket of a ball-and-socket joint;
   a pedestal having a ball of the ball-and socket joint at least partially contacting a concave surface of the socket; and
   a fastener extending through an opening in the ball and securing the cradle to the pedestal by compressing the ball-and-socket joint,
   the cradle having an opening through which an end of the fastener is accessible.

2. A hang-up assembly according to claim 1 wherein the socket is dome shaped.

3. A hang-up assembly according to claim 1 wherein the ball is dome shaped.

4. A hang-up assembly according to claim 1 wherein the fastener comprises:
   a threaded fastener; and
   a nut.

5. A hang-up cup assembly according to claim 4 wherein the nut comprises: a protrusion biting into a concave surface of the ball.

6. A hang-up cup assembly according to claim 4 wherein the nut further comprises:
   a threaded hole for receiving the threaded fastener.

7. A hang-up cup assembly according to claim 6 wherein the nut is dome shaped.

8. A hang-up cup assembly according to claim 7 wherein the threaded hole is located at an apex of the nut.

9. A hang-up cup assembly according to claim 1 wherein the cradle further comprises:
   a fastener for detachably retaining a portable electronic device.

10. A hang-up cup assembly according to claim 9 wherein the portable electronic device is a radiotelephone.

11. A hang-up cup assembly comprising:
    a cradle having body and a socket of a ball-and-socket joint;
    a first hole in the body of the cradle extending through the socket;
    a mount having a ball of the ball-and-socket joint;
    a second hole in the ball;
    a threaded fastener for insertion into the first hole and the second hole; and
    a threaded nut for engaging with the threaded fastener to compress the ball-and-socket joint, the threaded nut having a tooth engageable with a portion of the ball-and-socket joint.

12. A hang-up cup assembly according to claim 11 wherein the second hole has a larger diameter than the first hole.

13. A hang-up cup assembly according to claim 11 wherein the body has a recess for receiving a head of the threaded fastener when the threaded fastener is inserted into the first hole.

14. A hang-up cup assembly according to claim 11 wherein the tooth engages a concave surface of the ball and retains the cradle in a fixed position relative to the pedestal when the threaded fastener is tightened.

15. A hang-up cup assembly comprising:
    a cradle, for detachably retaining a radiotelephone;
    a pedestal, for affixing to a mounting surface;
    a ball-and-socket joint, for coupling the cradle to the pedestal, having a first hole in a ball of the ball-and-socket joint and a second hole in a socket of the ball-and-socket joint; and
    a fastener, for passing through the first hole and the second hole and compressing the ball-and-socket joint,
    the cradle having an opening through which a driver end of the fastener is accessible.

16. A hang-up cup assembly according to claim 15, wherein the ball is coupled to the pedestal.

17. A hang-up cup assembly according to claim 15, wherein the socket is coupled to the cradle.

18. A hang-up cup assembly according to claim 15, wherein the fastener comprises:
    a threaded fastener; and
    a nut.

19. A hang-up cup assembly according to claim 18, wherein the nut is dome-shaped.

20. A hang-up cup assembly according to claim 19, wherein the nut comprises:
    a threaded hole for receiving the threaded fastener.

* * * * *